US007991769B2

(12) United States Patent
Fontoura et al.

(10) Patent No.: US 7,991,769 B2
(45) Date of Patent: *Aug. 2, 2011

(54) SYSTEM AND METHOD FOR BUDGETED GENERALIZATION SEARCH IN HIERARCHIES

(75) Inventors: Marcus Felipe Fontoura, Los Gatos, CA (US); Vanja Josifovski, Los Gatos, CA (US); Christopher Olston, Los Altos, CA (US); Shanmugasundaram Ravikumar, Cupertino, CA (US); Andrew Tomkins, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 394 days.

This patent is subject to a terminal disclaimer.

(21) Appl. No.: 11/483,048

(22) Filed: Jul. 7, 2006

(65) Prior Publication Data

US 2008/0010251 A1 Jan. 10, 2008

(51) Int. Cl.
*G06F 17/30* (2006.01)

(52) U.S. Cl. .................... 707/719; 707/713; 707/722

(58) Field of Classification Search ............. 707/718, 707/719, 722, 728, 713
See application file for complete search history.

(56) References Cited

U.S. PATENT DOCUMENTS

| | | | | |
|---|---|---|---|---|
| 5,924,090 A * | 7/1999 | Krellenstein | ................. | 707/5 |
| 6,928,445 B2 * | 8/2005 | Agrawal et al. | ............. | 707/101 |
| 7,107,264 B2 * | 9/2006 | Lu | ................. | 707/3 |
| 7,117,207 B1 * | 10/2006 | Kerschberg et al. | ............ | 707/5 |
| 7,181,438 B1 * | 2/2007 | Szabo | ............... | 707/2 |
| 2004/0186827 A1 * | 9/2004 | Anick et al. | ............. | 707/3 |
| 2004/0243632 A1 * | 12/2004 | Beyer et al. | .............. | 707/104.1 |
| 2006/0173873 A1 * | 8/2006 | Prompt et al. | ................ | 707/100 |
| 2007/0005622 A1 * | 1/2007 | Fernandes et al. | ........... | 707/101 |

OTHER PUBLICATIONS

R. Agrawal, A. Gupta, and S. Sarawagi. Modeling multidimensional databases. In *Proc. 13th ICDE*, pp. 232-243, 1997.
S. Agrawal, S. Chaudhuri, and G. Das. DBXplorer: A system for keyword-based search over relational databases. In *Proc. 18th ICDE*, pp. 5-16. 2002.
R. Baeza-Yates and B. Ribeiro-Neto. *Modern Information Retrieval*. Addison Wesley. 1999.
Y. Bartal. On approximating arbitrary metrics by tree metrics. In *Proc. 30th ACM STOC*, pp. 161-168, 1998.
S. Brin and L. Page. The anatomy of a large-scale hypertextual Web search engine. *WWW/Cornputer Networks*, 30(1-7):107-117, 1998.
A. Z. Broder, D. Carmel, M. Herscovici, A. Soffer, and J. Y. Zien. Efficient query evaluation using a two-level retrieval process. In *Proc. 12th ACM CIKM*, pp. 426-434, 2003.
H. Bronnimann and M. T. Goodrich. Almost optimal set covers in finite VC-dimension. In *Proc. 10th ACM SoCG*, pp. 293-302, 1994.

(Continued)

*Primary Examiner* — Apu M Mofiz
*Assistant Examiner* — Mohammad N Rahman
(74) *Attorney, Agent, or Firm* — Michael J. Buchenhorner

(57) ABSTRACT

An improved system and method is provided for searching a collection of objects that may be located in hierarchies of auxiliary information for retrieval of response objects. A framework to perform a generalization search in hierarchies may be used to generalize a search by moving up to a higher level in a hierarchy of taxonomies or to specialize a search by moving down to a lower level in the hierarchy of taxonomies. Once the system may decide to enumerate response objects at a particular level of generalization, a budgeted generalization search may be used for enumerating a set of response objects within a budgeted cost.

22 Claims, 8 Drawing Sheets

OTHER PUBLICATIONS

D. Burdick, P. M. Deshpande, T. S. Jayram, R. Ramakrishnan, and S. Vaithyanathan. OLAP over uncertain arid imprecise data. In *Proc. 31st VLDB*, pp. 970-981, 2005.

Y.-Y. Chen, T. Suel, and A. Markowetz. Efficient query processing in geographic web search engines. In *Proc. ACM SIGMOD*, pp. 277-288, New York, NY, USA, 2006. ACM.

K. L. Clarkson and K. Varadarajan. Improved approximation algorithms for geometric set cover. In *Proc. 21st ACM SoCG*, pp. 135-141, 2005.

W. F. Cody, J. T. Kreulen, V. Krishna. and W. S. Spangler. The integration of business intelligence and knowledge management. *IBM Systems Journal*, 41(4):697-713, 2002.

G. Cormode, F. Korn, S. Muthukrishnan, and D. Srivastava. Diamond in the rough: Finding hierarchical heavy hitters in multi-dimensional data. In *Proc. ACM SIGMOD*, pp. 155-166, 2004.

R. Fagin, R. Guha, R. Kumar, J. Novak, D. Sivakumar, and A. Tomkins. Multi-structural databases. In *Proc. 24th PODS*, pp. 184-195, 2005.

R. Fagin, P. Kolaitis, R. Kumar, J. Novak, D. Sivakumar, and A. Tomkins. Efficient implementation of large-scale multi-structural databases. In *Proc. 31st VLDB*, pp. 958-969, 2005.

R. Fagin, A. Lotern, and M. Naor. Optimal aggregation algorithms for middleware. *JCSS*, 66(4):614-656, 2003.

D. Florescu, D. Kossmann, and I. Manolescu. Integrating keyword search into XML query processing. *Computer Networks*, 33(1-6):119-135, 2000.

M. Fontoura, V. Josifovski, E. Shekita, and B. Yang. Optimizing cursor movement in holistic twig joins. In *Proc. 14th ACM CIKM*, pp. 784-791, 2005.

M. Fontoura, E. J. Shekita, J. Y. Zien, S. Rajagopalan, and A. Neumann. High performance index build algorithms for intranet search engines. In *Proc. 30th VLDB*, pp. 1158-1169, 2004.

H. Garcia-Molina, J. Ullman, and J. Widom. *Database System Implementation*. Prentice Hall, 2000.

J. Gray, S. Chaudhuri, A. Bosworth, A. Layman, D. Reichart, M. Venkatrao, F. Fellow, and H. Pirahesh. Data cube: A relational aggregation operator generalizing group-by, cross-tab, and sub-totals. *DMKD*, 1(1)29-53, 1997.

D. Gruhl, L. Chavet, D. Gibson, J. Meyer, P. Pattanayak, A. Tomkins, and J. Y. Zien. How to build a WebFountain: An architecture for large-scale text analytics. *IBM Systems Journal*, 43(1):64-77, 2004.

S. Heinz and J. Zobel. Efficient single-pass index construction for text databases. *JASIST*. 54(8), 2003.

V. Hristidis, L. Gravano, and Y. Papakonstantinou. Efficient IR-style keyword search over relational databases. In *Proc. 29th VLDB*, pp. 850-861, 2003.

H. V. Jagadish, L. S. Lakshmanan, and D. Srivastava. What can hierarchies do for data warehouses? In *Proc. 25th VLDB*, pp. 530-541, 1999.

V. Kacholia, S. Pandit, S. Chakrabarti, S. Sudarshan, R. Desai, and H. Karambelkar. Bidirectional expansion for keyword search on graph databases. In *Proc. 31st VLDB*, pp. 505-516, 2005.

E. Kandogan, R. Krishnamurthy, S. Raghavan, S. Vaithyanathan, and H. Zhu. Avatar semantic search: A database approach to information retrieval. In *Proc. ACM SIGMOD*, pp. 790-792, 2006.

D. Lewis, Y. Yang, T. Rose, and F. Li. RCV1: A new benchmark collection for text categorization research. *JMLR*, 5:361-397, 2004.

X. Long and T. Suel. Optimized query execution in large search engines with global page ordering. In *Proc. 29th VLDB*. pp. 129-140, 2003.

S. Melnik, S. Raghavan, B. Yang, and H. Garcia-Molina. Building a distributed full-text index for the web. In *Proc. 10th WWW*, pp. 396-406, 2001.

L. Page, S. Brin, R. Motwani, and T. Winograd. The pagerank citation ranking: Bringing order to the web. Technical report, Stanford Digital Library Technologies Project, 1998.

H. Turtle and J. Flood. Query evaluation: strategies and optimizations. *IPM*, 31(6), 1995.

I. Witten, A. Moffat, and T. Bell. *Managing Gigabytes*. Morgan Kaufmann, 1999.

Y. Xu and Y. Papakonstantinou. Efficient keyword search for smallest LCAs in XML databases. In *Proc. ACM SIGMOD*, pp. 537-538, 2005.

K.-P. Yee, K. Swearingen, K. Li, and M. Hearst. Faceted metadata for image search and browsing. In *Proc. ACM CHI*, pp. 401-408, 2003.

X. Zhou, J. Gaugaz, W.-T. Balke, and W. Nejdl. Query relaxation using malleable schemas. In *Proc. ACM SIGMOD*, pp. 545-556, 2007.

M. Fontoura, V. Josifovski, R. Kumar, C. Olston, A. Tomkins and S. Vassilvitskii. Relaxation in Text Search using Taxonomies, *34th International Conference on Very Large Data Bases* (VLDB 2008), 672-683, Auckland, New Zealand, 2008.

U.S. Appl. No. 11/483,047, filed Jul. 7, 2006, Office Action, Correspondence Mailing Date Mar. 16, 2010.

* cited by examiner

SYSTEM AND METHOD FOR BUDGETED GENERALIZATION SEARCH IN HIERARCHIES

CROSS-REFERENCE TO RELATED APPLICATIONS

The present invention is related to the following United States patent application, filed concurrently herewith and incorporated herein in its entirety:

"System and Method for Generalization Search In Hierarchies," U.S. patent application Ser. No. 11/483,047.

FIELD OF THE INVENTION

The invention relates generally to computer systems, and more particularly to an improved system and method for searching a collection of objects having textual content and being furthermore located in hierarchies of auxiliary information for retrieval of response objects.

BACKGROUND OF THE INVENTION

Information retrieval systems have developed specialized data structures and algorithms to perform a specific task: ranked retrieval of documents. These systems are increasingly being called upon to incorporate more complex processing into query evaluation. Some extensions, such as query expansion for instance, may be handled using the existing information retrieval systems. Other extensions, such as static scoring, may be incorporated by making changes to the underlying system. But an increasingly prominent set of desired extensions do not naturally fit within the traditional search and retrieval systems used to query a collection of documents, and are typically addressed through post-processing of standard result lists. Although functional, implementation of such desired extensions to traditional search and retrieval systems have unfortunately resulted in somewhat of a kludge.

For example, consider a person on a business trip who may enter a query, "deep dish pizza in Palo Alto" through a web browser interface to a search engine. A typical search engine may find certain pages that contain an exact or partial match to the string "deep dish pizza." A search engine may also find some documents in the system have been labeled as restaurants, and of those, some may have also been labeled more specifically as pizza restaurants. Furthermore, the person may be a recognized user who may be a member of a social network in which people indicate web sites of organizations or establishments they endorse.

One strategy for using an existing information retrieval system to process the query would be to use an inverted text index to obtain documents relevant to "deep dish pizza," and then perform post-process using the social network and geographical data. However, text matching may not represent the most selective access path, especially if relaxed matching semantics may be employed. Moreover, other metadata may not offer efficient random access to proximity information, such as in an extreme case where the search term may be very broad, but the metadata may be highly selective. The approach of first scanning the results of the search query and then post-processing by making calls to a separate metadata engine could potentially result in millions of accesses to process a relatively straightforward query. Hence this strategy may not always perform well.

What is needed is a novel framework that may more comprehensively extend the traditional information retrieval framework to more naturally accommodate the growing number of desired extensions for information retrieval. Such a system and method should to consider a broader space of evaluation strategies by allowing generalization along one or more dimensions, yet perform well and ensure sufficient result cardinality.

SUMMARY OF THE INVENTION

Briefly, the present invention may provide a system and method for searching a collection of objects that may be located in hierarchies of auxiliary information for retrieval of response objects. In various embodiments, a client having a web browser may be operably coupled to a server having a query processor for querying a collection of objects that may each include textual content and that may also be located within several independent taxonomies of auxiliary information. The query processor may include an operably coupled generalization search driver for directing a search through levels of a hierarchy of a plurality of taxonomies to find response objects matching one or more keywords of a query and matching one or more locations in the taxonomies, a search analysis engine for determining a ranked list of response objects matching keywords of a query and matching locations in a hierarchy of taxonomies, and a budgeted search analysis engine for finding response objects matching keywords of a query and matching locations in a hierarchy of taxonomies within a budgeted cost.

The generalization search driver may guide a search for an appropriate level of generalization within a hierarchy of taxonomies using various techniques and may include a top-down search driver for searching downward through the levels of the hierarchy of taxonomies, a bottom-up search driver for searching upward through the levels of the hierarchy of taxonomies, and a binary search driver for searching upward or downward through the levels of the hierarchy of taxonomies. The budgeted search analysis engine may find response objects within a budgeted cost at a given level of generalization within a hierarchy of taxonomies and may include a cover set analysis engine for determining sets of points covering an area within a hierarchy of the taxonomies bounded by locations of the taxonomies. The cover set analysis engine may, in turn, include a cost cover set analysis engine for determining an optimal cost cover set for an area of a hierarchy of two taxonomies bounded by locations of the taxonomies. And the cover set analysis engine may also include a weighted cover set analysis engine for determining a weighted cover set for an area of the hierarchy of taxonomies bounded by locations of the taxonomies.

The present invention may also provide a framework to perform a generalization search in hierarchies. At a particular level in a hierarchy of taxonomies, candidate response objects may be found and scored. In an embodiment, the search may be generalized by moving up to a higher level in the hierarchy of taxonomies or may be specialized by moving down to a lower level in the hierarchy of taxonomies, based upon the number of response objects scored. Once the system may decide to enumerate response objects at a particular level of generalization, a budgeted generalization search may be used in an alternate embodiment for enumerating the set of response objects within a budgeted cost. In the case where there may be two taxonomies, dynamic programming may be applied to iteratively determine a minimal-cost cover for a set of rectangles covering a simplex within the hierarchy of two taxonomies bounded by the one or more locations in order to enumerate response objects within a budgeted cost. For more than two taxonomies, a greedy algorithm may be applied to determine a minimal weight set cover for a multi-dimensional grid of points within the hierarchy of the taxonomies bounded by the one or more locations in order to enumerate response objects within a budgeted cost.

Advantageously, the present invention may provide a framework to allow generalization for searching along one or more dimensions of auxiliary information and to allow adaptive query evaluation to ensure sufficient as well as relevant search results. The present invention may also provide a framework for generalization searching for any types of object that may be located in taxonomies of auxiliary information and that may include textual content, such as text, multimedia content, audio and images annotated or associated with textual content, and so forth. Other advantages will become apparent from the following detailed description when taken in conjunction with the drawings, in which:

DETAILED DESCRIPTION

Exemplary Operating Environment

Figure 1:
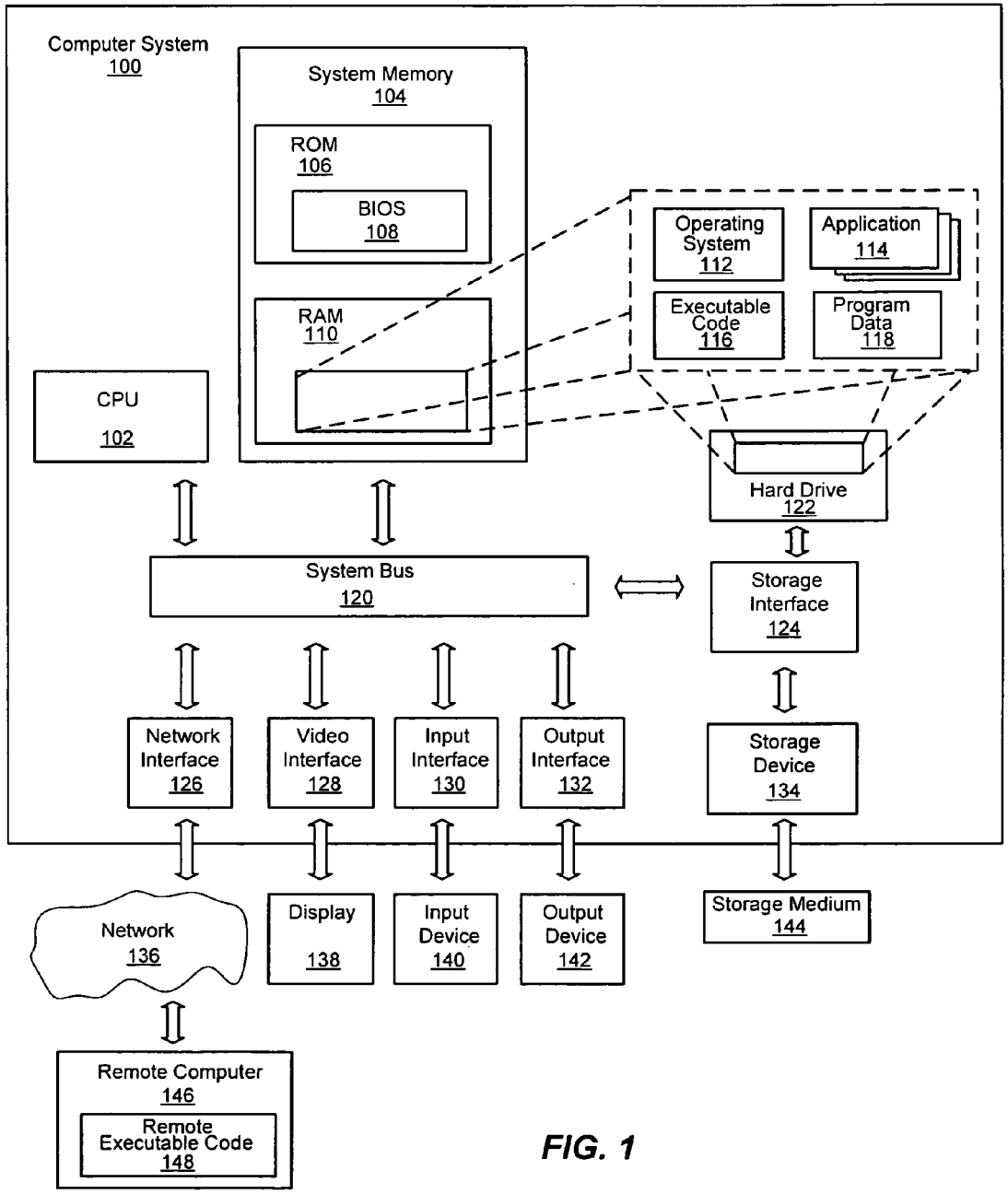
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Generalization Search in Hierarchies

The present invention is generally directed towards a system and method for querying a set of objects that may each include textual content and that may also be located within several independent taxonomies of auxiliary information such as geographic location, topic, and so forth. A query may consist of a traditional textual query augmented with a requested location in zero or more of the taxonomies. A candidate result document may be rewarded for matching the textual query, and for matching a requested taxonomy location as closely as possible. The query answer may consist of a ranked list of documents in descending order of a score function which captures document quality, textual match, and taxonomy match.

The generalization search driver may guide a search for an appropriate level of generalization within a hierarchy of taxonomies using various techniques. As will be seen, the techniques described may adjust the degree of generalization dynamically based upon the response objects seen so far. Once the system may decide to enumerate response objects at a particular level of generalization, a budgeted generalization search may be used in an embodiment for enumerating the set of response objects within a budgeted cost. As will be understood, the various block diagrams, flow charts and scenarios described herein are only examples, and there are many other scenarios to which the present invention will apply.

Figure 2:
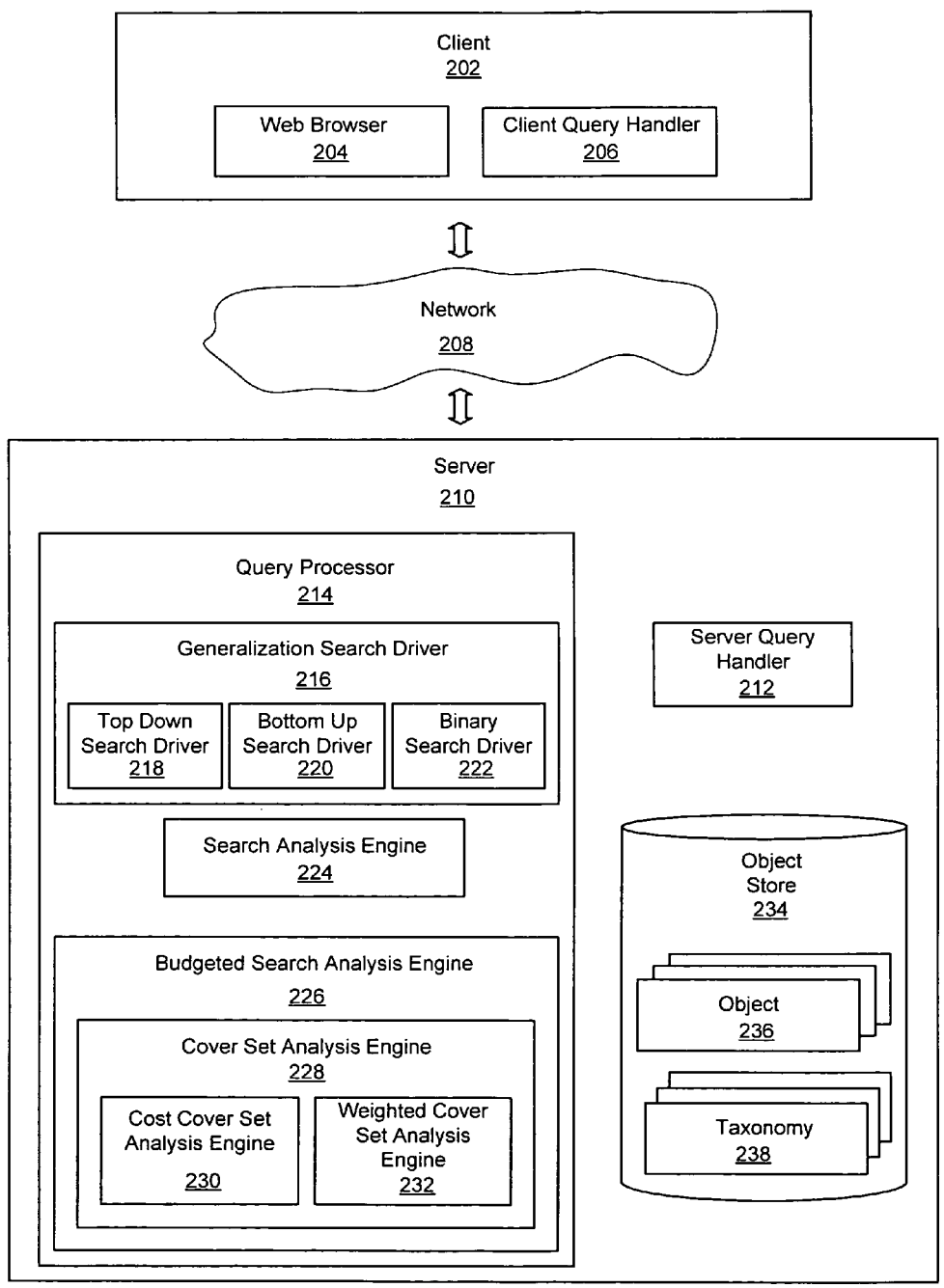
FIG. 2 is a block diagram generally representing an exemplary architecture of system components in an embodiment for searching a collection of objects that may each have textual content and that may each be furthermore located in hierarchies of auxiliary information for retrieving a list of response objects, in accordance with an aspect of the present invention.

Turning to FIG. 2 of the drawings, there is shown a block diagram generally representing an exemplary architecture of system components in an embodiment for searching a collection of objects that may each have textual content and that may each be furthermore located in hierarchies of auxiliary information for retrieving a list of response objects. Those skilled in the art will appreciate that the functionality implemented within the blocks illustrated in the diagram may be implemented as separate components or the functionality of several or all of the blocks may be implemented within a single component. For example, the functionality for the budgeted search analysis engine 226 may be included in the same component as the generalization search driver 216. Or the functionality of the search analysis engine 224 may be implemented as a separate component from the generalization search driver 216. Moreover, those skilled in the art will appreciate that the functionality implemented within the blocks illustrated in the diagram may be executed on a single computer or distributed across a plurality of computers for execution.

In various embodiments, a client computer 202 may be operably coupled to one or more servers 210 by a network 208. The client computer 202 may be a computer such as computer system 100 of FIG. 1. The network 208 may be any type of network such as a local area network (LAN), a wide area network (WAN), or other type of network. A web browser 204 may execute on the client computer 202 and may include functionality for receiving a query request from a user and displaying result objects obtained as search results from query processing. The web browser 204 may be operably coupled to a client query handler 206 The client query handler 206 may include functionality for receiving a query request from the web browser and for sending the query request to a server to obtain search results. The web browser 204 and the client query handler 206 may be any type of interpreted or executable software code such as a kernel component, an application program, a script, a linked library, an object with methods, and so forth.

The server 210 may be any type of computer system or computing device such as computer system 100 of FIG. 1. In general, the server 210 may provide query processing services for obtaining search results for query requests. The server 210 may include a server query handler 212 for receiving and responding to query requests for obtaining result objects. The server 210 may also include a query processor 214 for providing services for querying a set of objects that may each include textual content and that may also be located within several independent taxonomies of auxiliary information such as geographic location, topic, and so forth. The query processor 214 may be operably coupled to a generalization search driver 216 for directing a search through levels of a hierarchy of taxonomies to find response objects matching keywords of a query and matching locations in the taxonomies, a search analysis engine 224 for determining a ranked list of response objects matching keywords of a query and matching locations in a hierarchy of taxonomies, and a budgeted search analysis engine 226 for finding response objects matching keywords of a query and matching locations in a hierarchy of taxonomies within a budgeted cost.

The generalization search driver 216 may guide a search for an appropriate level of generalization within a hierarchy of taxonomies using various techniques. Accordingly, the generalization search driver 216 may include a top-down search driver 218, a bottom-up search driver 220, and a binary search driver 222. The top-down search driver 218 may begin processing at the top-most level of the hierarchy of taxonomies and search downward through the levels of the hierarchy of taxonomies. The bottom-up search driver 220 may begin processing at the bottom-most level of the hierarchy of taxonomies and search upward through the levels of the hierarchy of taxonomies. And the binary search driver 222 may begin processing at a middle level of the hierarchy of taxonomies and may either move up or down the levels of the hierarchy of taxonomies, as in a usual binary search. Those skilled in the art will appreciate the any one of these search drivers may be used for determining a level of generalization within a hierarchy of taxonomies for searching for response objects when performing a generalization search.

The budgeted search analysis engine 226 may find response objects within a budgeted cost at a given level of generalization within a hierarchy of taxonomies. The budgeted search analysis engine 226 may include a cover set analysis engine 228 for determining sets of points covering an area within a hierarchy of the taxonomies bounded by locations of the taxonomies. The cover set analysis engine 228 may, in turn, include a cost cover set analysis engine 230 for determining an optimal cost cover set for an area of a hierarchy of two taxonomies bounded by locations of the taxonomies. And the cover set analysis engine 228 may also include a weighted cover set analysis engine 232 for determining a weighted cover set for an area of the hierarchy of taxonomies bounded by locations of the taxonomies.

Each of the drivers and engines included in the server 210 may be any type of executable software code such as a kernel component, an application program, a linked library, an object with methods, or other type of executable software code. The server 210 may be operably coupled additionally to a database of objects such as object store 234 that may include any type of objects 236 that may have textual content and that may also be located within several independent taxonomies of auxiliary information, such as geographic location, topic, and so forth.

There may be a variety of applications in which a set of candidate response objects, such as documents, may be placed into multiple taxonomies. In some applications, a user may enter a query, and the system may search the multiple taxonomies and return response objects that may best match the query. Consider an example in which there may be a corpus of various documents that may be homepages of stores, and assume that there may be two taxonomies for this corpus: $T_1$ may be a taxonomy on locations and $T_2$ may be a taxonomy on store types. Several stores may each have a location that corresponds to a node in $T_1$ and a store type that corresponds to a node in $T_2$. Focusing for now on the hierarchical aspects of a query, consider that a user, who may be interested in finding a pizza place on University Avenue in Palo Alto, Calif., enters a textual query of "pizza places on University Avenue in Palo Alto Calif" in a web browser. Such a query may be represented as a pair of leaf nodes, one from each taxonomy: $<l_1, l_2>$, in which $l_1$ may be a node of $T_1$ corresponding to University Ave, and $l_2$ may be a node of $T_2$ corresponding to pizza places. If there may be sufficient pizza places on University Avenue, the query may be trivially computed. However, as may be the case, there may be no results that exactly match the query, and it may be necessary to generalize in one or both dimensions in order to find a matching pizza place.

Figure 3:
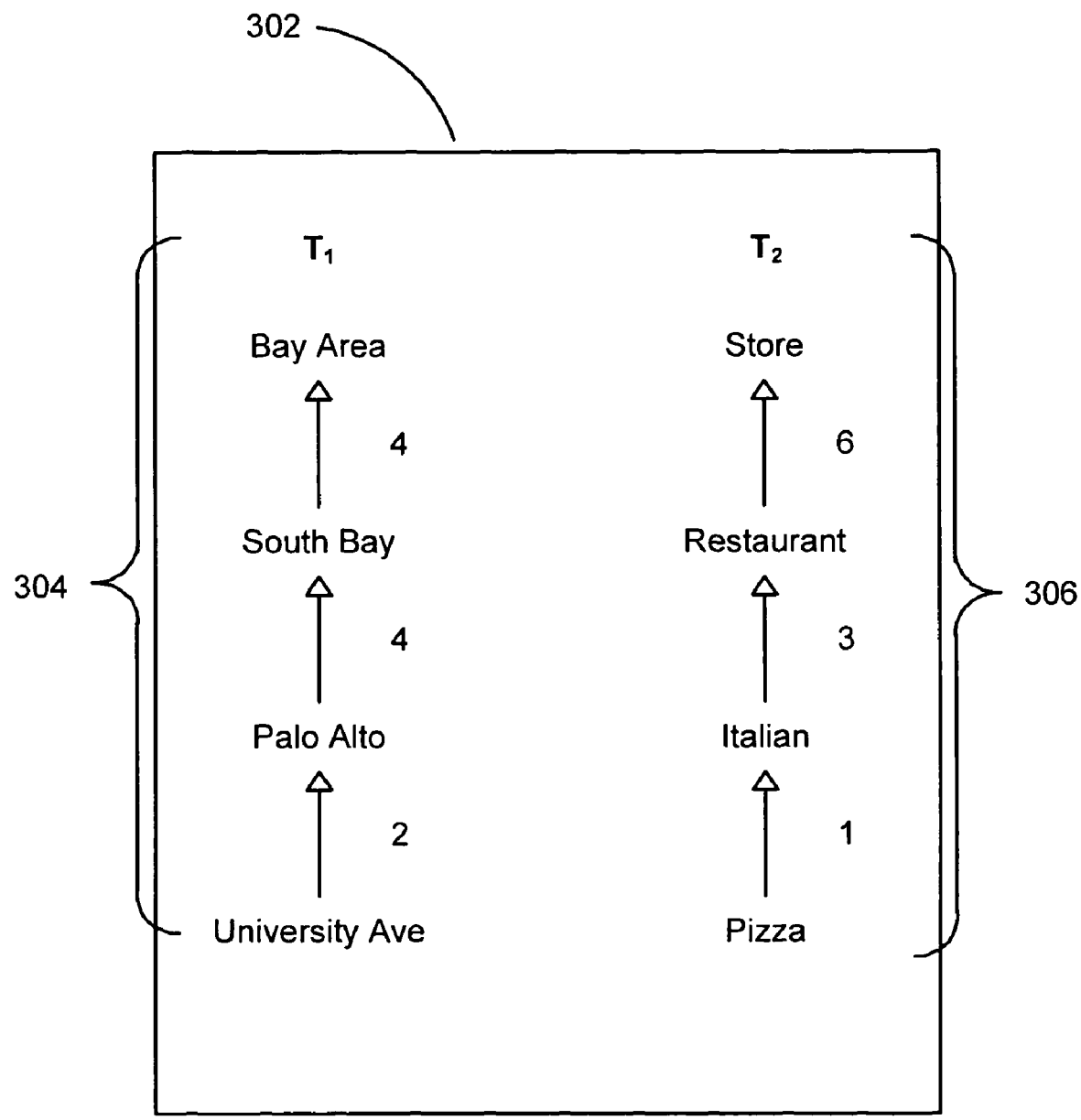
FIG. 3 is an illustration depicting a generalization path within a taxonomy in the embodiment of a weighted tree, in accordance with an aspect of the present invention.

For each taxonomy, the options for generalizing may be determined by tracing a path from the queried node $l_j$ to the root of the taxonomy. For example, FIG. 3 presents an illustration depicting a generalization path within a taxonomy in the embodiment of a weighted tree. More particularly, FIG. 3 illustrates two generalization paths 302 and the cost of each generalization for taxonomy tree $T_1$ 304 and taxonomy tree $T_2$ 306. Notice that generalizing from pizza places to Italian restaurants for taxonomy tree $T_2$ may be fairly inexpensive, while generalizing from restaurants to other types of stores may be very expensive. A reasonable generalization therefore may allow other types of restaurants, but may not be likely to return a document about a chandlery. As this example may illustrate, generalizing from pizza places to Italian restaurants should cost 1, while generalizing to other types of restaurants should cost 4. Accordingly, the appropriate measure of generalization cost may be the distance from the query node to the least common ancestor (LCA) of the query node and the document. For instance, a proposed response of a Greek restaurant in Palo Alto would incur a cost of 2 for taxonomy tree $T_1$ to generalize from University Ave to Palo Alto, and a cost of 4 for taxonomy tree $T_2$ to generalize from a pizza place to an arbitrary restaurant. The overall generalization cost would therefore be 6.

Figure 4:
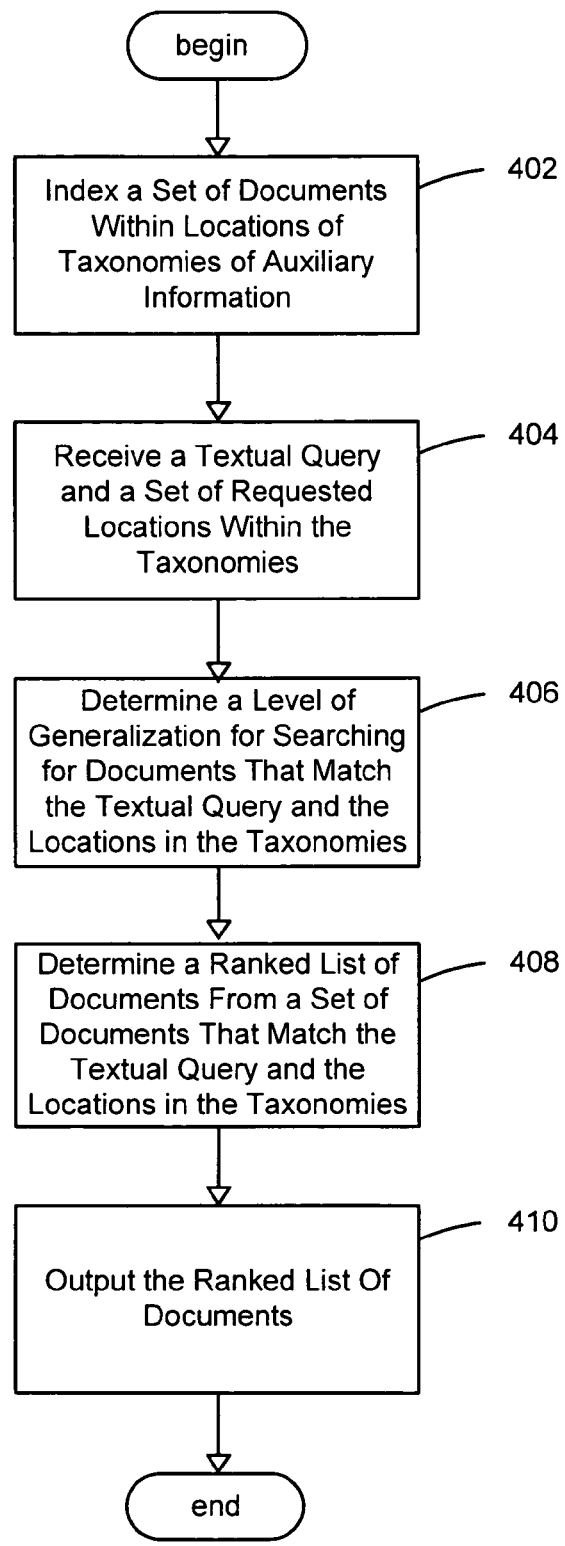
FIG. 4 is a flowchart generally representing the steps undertaken in one embodiment for performing a generalization search in hierarchies, in accordance with an aspect of the present invention.

FIG. 4 presents a flowchart generally representing the steps undertaken in one embodiment for performing a generalization search in hierarchies. At step 402, a set of documents may be indexed and may be placed within locations of taxonomies of auxiliary information. More formally, consider D to be a corpus of documents and a taxonomy to be represented as a tree whose edges have non-negative weights. The notation $t \in T$ may be used to denote that a node t belongs to the taxonomy tree T and use $T|_t$ to denote the subtree of T rooted at node t. Consider root(T) to denote the root of T, wdepth(T) to denote the maximum weighted path length in T, and depth (T) to denote the maximum unweighted path length. For a taxonomy T, consider that each document $d \in D$ may be associated with at most one node T, denoted $d^T \in T$. For $t \in T$, docs(t) may be used to denote the set of documents that may be associated with some node in the subtree $T|_t$; this definition may capture the generalization aspect of taxonomies. Consider $T_1, \ldots, T_m$ to be the given taxonomies and consider $d_j^T \in T_j$ to denote the node in the j-th taxonomy associated with document d.

After the set of documents have been placed into multiple taxonomies, a document may appear at zero or more nodes of each taxonomy. At step 404, a textual query and a set of requested locations within the taxonomies may be received. For example, a user-entered query may have two components: a text component and a set of taxonomy nodes. More formally, a query Q may consist of text keywords $Q^k$ and a vector of taxonomy nodes $Q^T = <Q_1^T, \ldots, Q_m^T>$, where $Q_j^T \in T_j$. In various embodiments, each query may have a node associated with every taxonomy. If a taxonomy may not contain all documents of a corpus, the taxonomy may be extended by adding a new root node with two children: the original root, and a new child called 'other'. Additionally, a parameter k specifying the number of desired results may also be included in the query in an embodiment.

In response to receiving a textual query and a set of requested locations within the taxonomies, the system may determine what level of generalization within the space of possible generalizations may be appropriate for searching for a list of documents at step 406. In an embodiment, the search may be directed to be more generalized by increasing the level of generalization or the search may be directed to be more specialized by decreasing the level of generalization. Upon determining a level of generalization, a ranked list of documents may be determined at step 408 from the set of documents that match the textual query and the locations in the taxonomies. In an embodiment, the answer to a query may be a list of the top k results, ranked in decreasing order according to the following scoring function:

score(d, Q)=static(d)+text(d, $Q^k$)+tax(d, $Q^T$), where static (d) may return a static score for document d, text(d, $Q^k$) may return a text score for document d with respect to keywords $Q^k$, and tax(d, $Q^T$) may returns a taxonomy score that may be a generalization cost for document d with respect to taxonomy nodes $Q^T$.

In an embodiment, the static score may be defined as static (d) $\in [0, U_s]$, where $U_s$ may be an upper bound on the static score of any document. In this case, a lower static score may indicate a better match for a document. The text score may be defined in an embodiment for general text matching as text(d, $Q^k$) $\in [0, U_t]$, where $U_t$ may be an upper bound on the text score of any document for any query. Or, in an embodiment for boolean text matching, the text score may be defined as text(d, $Q^k$) $\in \{0,\infty\}$, where 0 may correspond to match and $\infty$ may correspond to no match. Finally, the taxonomy score may be defined in an embodiment to be $$\text{tax}(d, Q^T) = \sum_{j=1}^{m} \text{tax}(d, Q_j^T),$$

where $\text{tax}_j(d, Q_j^T)$ gives the generalization cost for document d with respect to the taxonomy node $Q_j^T$ as:

$\text{tax}_j(d, Q^T_j)=d_{T_j}(Q_j^T,\text{lca}(d^T_j,Q^T_j))$, where $d^T_j$ may be the tree distance in taxonomy j, based on the weights on the edges of the tree $T_j$.

In another embodiment, the taxonomy score may be defined as a symmetric function of a query node and a document node. In this embodiment, the taxonomy score may be a symmetric taxonomy cost defined as $\text{tax}'_j(d, Q^T_j)=\phi_j(\text{lca}(d^T_j, Q^T_j))$. The weights may be chosen such $\text{tax}'_j(d, Q^T_j)=\text{tax}_j(d, Q^T_j)+f(Q^T_j)$, for some function f(•). Thus, the two measures may differ in this embodiment by an additive factor that may be independent of the result object, so that the top result objects under the two measures may be identical. To achieve this property, the weights may be assigned such that the weight of node t may be $\phi_j(t)=\text{wdepth}(T_j)-d_{T_j}(t, \text{root}(T_j))$.

After a ranked list of documents may be determined from the set of documents that match the textual query and the locations in the taxonomies, the ranked list of documents may be output at step 410 and processing may be finished for performing a generalization search in hierarchies.

Figure 5:
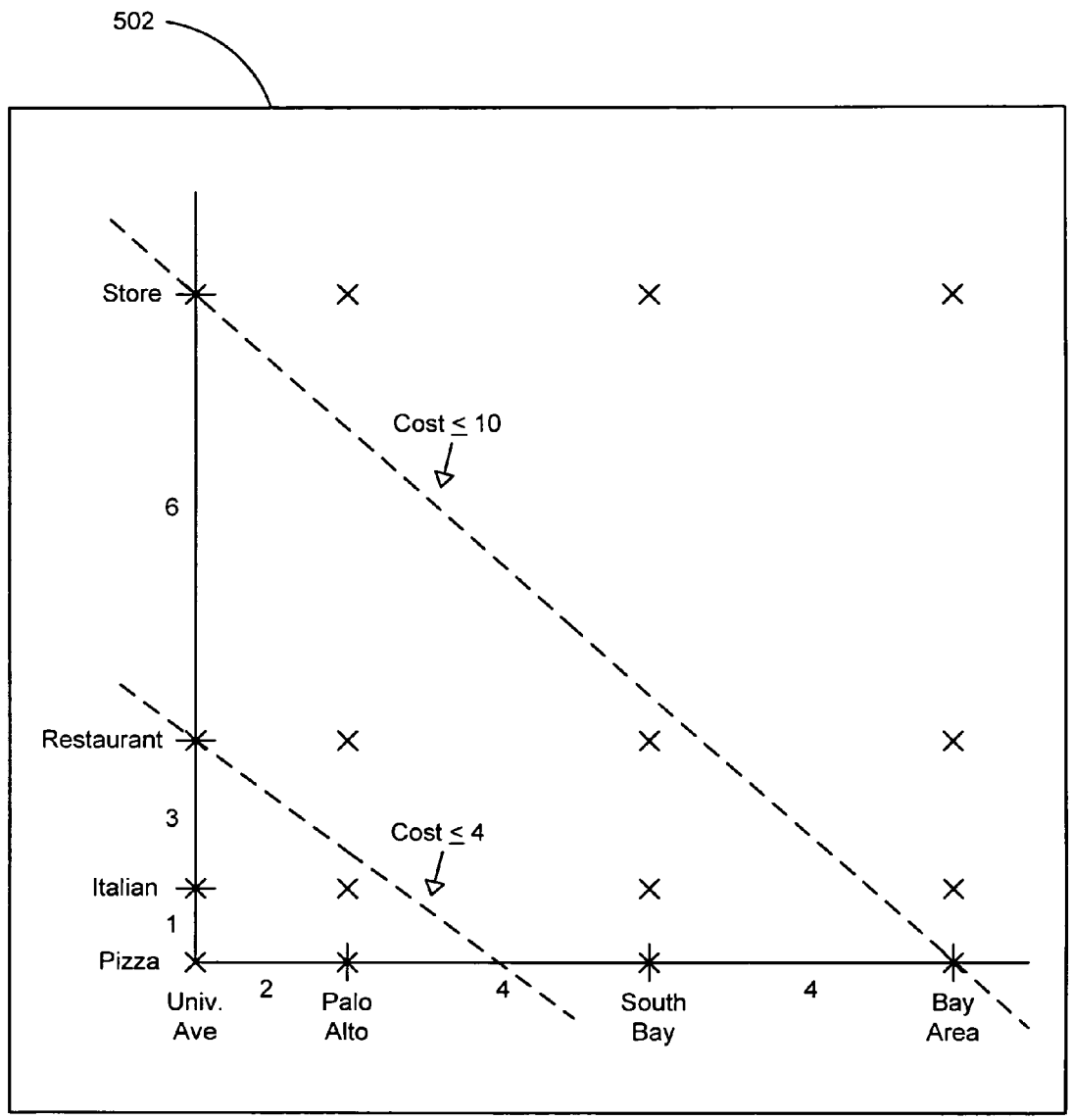
FIG. 5 is an illustration depicting in an embodiment a space of possible multi-dimensional generalizations for the generalization paths of FIG. 3, in accordance with an aspect of the present invention.

In order to provide a ranked list of documents according to the scoring function score(d,Q), the system may first determine what level of generalization within the space of possible generalizations may be appropriate for searching for a ranked list of documents. For example, FIG. 5 presents an illustration depicting in an embodiment a space of possible multi-dimensional generalizations for the generalization paths presented in FIG. 3. The possible generalizations in $T_1$ may be placed on the x-axis and the possible generalizations in $T_2$ may be placed on the y-axis of a Cartesian plane 502 as illustrated in FIG. 5. For each axis, a tick mark may be placed at all points for which a generalization exists. A grid point (x,y) for which both coordinates lie at a tick mark may represent a possible node in the product taxonomy, and the generalization cost of this node may be the sum of its coordinate, x+y. For instance, the top right tick mark may correspond to the node (Bay Area, Store), and its generalization cost may be 20.

More formally, notice that for document d and query q=$<l_1, \ldots, l_m>$, the taxonomy score may be represented as $\text{tax}_j(d,l_j)=d_T(l_j,\text{lca}(d,l_j))$, which depends on the least common ancestor of d and q. A node that may be a least common ancestor may be defined to be an ancestor of q, and for any such ancestor, the value of $\text{tax}_j$ may be simply the distance from q to this ancestor. Thus, possible generalization costs may be the distances from q to an ancestor, and such a framework may match the cost measure illustrated in FIG. 3. The overall space of possible generalizations in zero or more taxonomies may thus be a Cartesian product of the possible generalization in each dimension, which may be just the set of ancestors of q in each dimension. Hence, the overall space of possible generalizations can be modeled as an m-dimensional grid, where each grid point $(t_1, \ldots, t_m)$ may be such that $t_j \in T_j$. Each grid point may therefore be an element of the product taxonomy $T_1 \times \ldots \times T_m$, and in fact, $t_j$ may be on the path from $q_j$ to root $(T_j)$.

Furthermore, a grid point $(t_1, \ldots, t_m)$ may implicitly correspond to a subset of documents given by the intersection of the taxonomy nodes at each point; for example, all objects that may have both geography Palo Alto and restaurant type Italian. More formally, this may be defined as:

$\text{docs}(t_1, \ldots, t_m)=\cap_{j=1}^{m}\text{docs}(t_j)$. The generalization cost of this grid point with respect to the taxonomy nodes $(Q_1^T, \ldots Q_m^T)$ of the query Q may then be defined as:

$$\text{tax}(t_1, \ldots, t_m, Q) = \sum_{j=1}^{m} d_{T_j}(t_j, Q_j^T).$$

It may therefore be natural to locate $(t_1, \ldots, t_m)$ in $R^m$ at coordinates $(d_{T_1}(t_1, Q_1^T), \ldots, d_{T_m}(t_m, Q_m^T))$. The generalization cost of this point may then be exactly its $L_1$ norm, the sum of its coordinates. This may be the embedding shown in FIG. 5 for the possible generalizations of the two taxonomies.

Moreover, consider the continuum of generalization costs in the interval I=$[0,\text{tax}(\text{root}(T_1), \ldots, \text{root}(T_m),Q)]$. Each point b$\in$I may correspond to a simplex S(b) in the m-dimensional grid such that:

S(b)=$\{(t_1, \ldots, t_m)|\text{tax}(t_1, \ldots, t_m, Q\leq b\}$, so that S(b) may include all points in the grid that may have a generalization cost at most b. Thus, all the documents present in the nodes defined by the simplex S(b) may be defined by the expression, docs(S(b))=$\cup_{(t_1, \ldots, t_m)\in S(b)}$docs $(t_1, \ldots, t_m)$.

Turning again to FIG. 5, the set of all nodes in the grid with a generalization cost less than 10 may be the set of all nodes that satisfy x+y<10. In this representation, all points that can be represented with a particular upper bound on generalization cost may always be expressed as a simplex (which in two dimensions may be a triangle) whose diagonal edge may have the same slope. If the generalization cost may be given by the function tax(•), the slope may be −1. If instead it becomes valuable to place more weight on generalizations in $T_1$ rather than $T_2$ in an embodiment, then lines of any negative slope may be admitted. FIG. 5 also shows the simplex for cost≦4 which may be S(4)={(Univ Ave, Pizza), (Palo Alto, Pizza), (Univ Ave, Italian), (Palo Alto, Italian), (Univ Ave, Restaurant)}.

Notice that even though b∈I may be a continuous quantity, b∈I may have a discrete behavior because of the discrete nature of path lengths in the trees. By precomputation, an ordered list of values $B=b_1, \ldots, b_L$ may be identified, with $b_j \in I$ such that for any $b' \in [b_j, b_{j+1})$, $S(b')=S(b_j)$. As used herein, the notation of level j may denote $b_j$. The total number of levels may then be defined as:

$L \leq m \cdot \max_{j=1}^{m} \text{depth}(T_j)$. The notion of generalization and specialization have natural interpretations in the language of levels: generalization, as used herein, may mean to increase the level; and specialization, as used herein, may mean to decrease the level. In reference to FIG. 5 for example, the level corresponding to cost≦10 may be a generalization of the level corresponding to cost≦4, and the level corresponding to cost≦4 may be a specialization of the level corresponding to cost≦10.

Thus, for two grid points $g=(t_1, \ldots, t_m)$ and $g'=(t_1', \ldots, t_m')$, their least common ancestor may be defined to be $\text{lca}(g,g')=(\text{lca}(t_1,t_1'), \ldots, \text{lca}(t_m,t_m'))$, that is, the coordinate-wise least common ancestors in the corresponding trees. This notion may be extended to a subset G of grid points whereby lca(G) may denote their least common ancestor. In FIG. 5 for example, lca(S(4))=(Palo Alto, Restaurant) and lca(S(10))=(Store, Bay Area)). Note that by definition, docs (S(b)) ⊂ docs(lca(S(b)). As a result, focus on documents in docs(S(b)) may be restricted at a particular level by treating lca(S(b)) as a "query". For example, in reference to FIG. 5, to access documents in docs(S(4)), the query would be "Palo Alto AND Restaurants."

Figure 6:
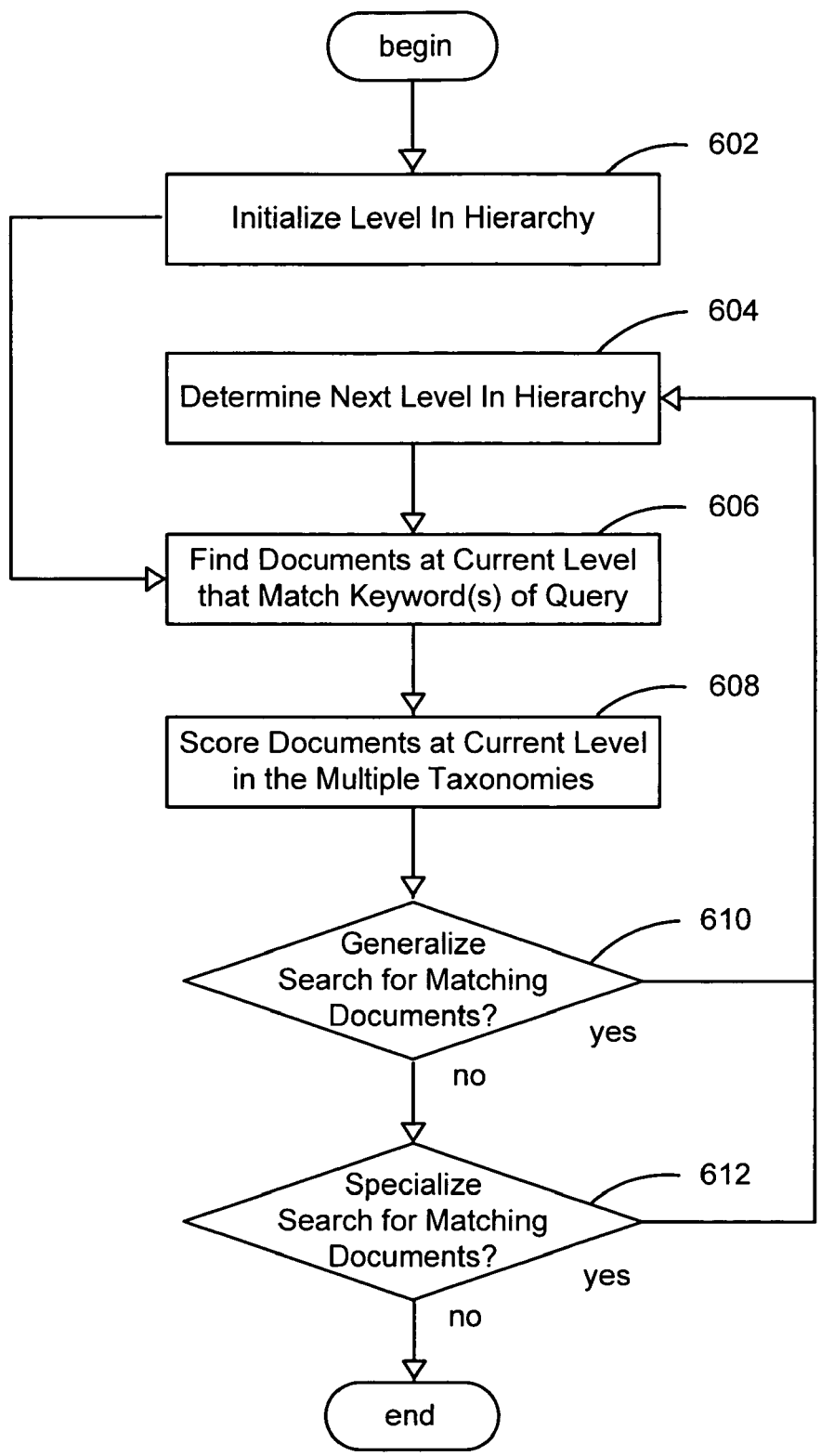
FIG. 6 is a flowchart generally representing the steps undertaken in one embodiment for determining a level of generalization within a hierarchy of taxonomies for searching for a ranked list of documents when performing a generalization search, in accordance with an aspect of the present invention.

FIG. 6 presents a flowchart generally representing the steps undertaken in one embodiment for determining a level of generalization within a hierarchy of taxonomies for searching for a ranked list of documents when performing a generalization search. More particularly, this process may find the minimal generalization cost b* such that |docs(S(b*))|≧k. At step 602, the level in the hierarchy of taxonomies may be initialized. In an embodiment, the level may be set at the bottom-most level, the top-most level, or at the middle level L/2. At step 606, documents may be found at the current level in the hierarchy of taxonomies that match keywords of the query. The documents at the current level l may be accessed by using the query $\text{lca}(S(b_l))$ on a conventional inverted index that may have been built over the documents previously.

At step 608, the documents found at the current level in the hierarchy of taxonomies may be scored. In an embodiment, each document may be scored using the function score(d,Q). At step 610, it may be determined whether to generalize the search for matching documents. In an embodiment, if all the documents found at this level may be scored before a threshold of k results may be obtained, then it may be determined to generalize further. And this may correspond to going one level up in the list B.

If it may be determined to generalize further at step 610, then processing may continue at step 604 where the next level in the hierarchy may be determined and then documents may be found at step 608. Otherwise, it may be determined whether to specialize the search for matching documents at step 612. In an embodiment, if there may be more than a threshold of k results obtained from scoring documents found at this level, then it may be determined to specialize further. And this may correspond to going down a level in the list B. If it may be determined to specialize further, then processing may continue at step 604 where the next level in the hierarchy may be determined. Otherwise, processing may be finished for determining a level of generalization within a hierarchy of taxonomies for searching for a ranked list of documents when performing a generalization search.

The following pseudocode may provide an implementation of the process described above for determining a level of generalization within the hierarchy of taxonomies for searching for a ranked list of documents:

```
initialLevel (L)
levelDone = false
while |R| < k ∨ ¬ levelDone)
    l = getNextLevel (l,levelDone)
    if (l < 0 ∨ l > L − 1) break
    levelDone = false
    while (|R| < k ∨ ∃d ∈ R, tax(d,Q) > b_l)
        ∧ ¬ levelDone
        levelDone = processNextDoc (Q,R,b_l).
```

This pseudocode may search for the minimal level l* such that $|\text{docs}(S(b_l*))| \geq k$. Consider L to denote the maximum level and l denote the current level. Also consider R to be the current set of results. The function processNextDoc $(Q,R,b_l)$ may take the current generalization cost $b_l$ and returns a set of documents R by scanning through the documents at level l. The function processNextDoc $(Q,R,b_l)$ may issue the query $\text{lca}(S(b_l))$ to the index. If it may finish scanning all the documents in docs(S($b_l$)) and |R|<k, then it may set the flag levelDone to true, indicating the need to generalize and proceed bottom-up. If |R| gets larger than k and all the documents in R have generalization cost at most $b_l$, then it sets levelDone to false and returns in order to indicate that specialization proceeding top-down may be possible without compromising the desired number of results.

There may two factors in this embodiment that may control the processing of the query when determining a minimum level of generalization within a hierarchy of taxonomies for searching for a ranked list of documents. The first may be the level at which the processing may begin, given by the function initialLevel (•). The second may be how to go from one level to another, given by the function getNextLevel (oldLevel, levelDone), where oldLevel may be the current level and levelDone may be a boolean flag that indicates whether scanning all the documents at the current level has completed. There may be three basic choices to realize these functions: bottom-up search, top-down search and binary search.

In an embodiment that may use a bottom-up search, processing may begin at the bottom-most level. If there may be at least k documents in the current level l, then processing may be done. Otherwise, there may be a need to generalize and this corresponds to going one level up to l+1. In this case, the querying process may need to be restarted, issuing a new query to the index that corresponds to $\text{lca}(S(b_{l+1}))$. The bottom-up search may perform well if there may be enough documents corresponding to the taxonomy nodes of the query. For example, if the taxonomy nodes of the query may be (Univ. Ave, Pizza) and if there may be more than k documents in (Palo Alto, Pizza), then the bottom-up algorithm can be expected to perform very well.

In another embodiment that may use a top-down search, processing may begin at the top-most level corresponding to level L. If there may be at most k documents at the current level l, processing may be done since specializing further will not help. Otherwise, it may be possible to specialize and still obtain k documents, but with a lower score given by the function score(d,Q). If so, then there may be a need to move down to level l−1. However, unlike in the bottom-up case, the results R that have been computed so far do not need to be abandoned. A postfiltering may be applied to R to realize the specialization corresponding to setting R=R ∩ docs(S($b_l$)). An important benefit may be that the cursors in the index that were used to realize the query lca(S($b_l$)) need not be discarded and may be re-used in realizing the query lca(S($b_{l-1}$)). The top-down search, therefore, would perform extremely well if generalization may be an efficient way to obtain k documents. In our example in FIG. 5, this would correspond to the case to continue to generalize until (South Bay, Restaurants) to obtain k results.

By using the levelDone flag in the pseudocode discussed above for providing an implementation of the process for determining a level of generalization, a single implementation of the getNextLevel (•) function may be provided for both the bottom-up and top-down search using the following pseudocode:

```
getNextLevel (oldLevel, levelDone)
    if (levelDone) return oldLevel + 1
    else return oldLevel − 1.
```

In yet another embodiment that may use a binary search, processing may begin at the middle level corresponding to level L/2. Depending on whether there may be enough documents at the current level l, there may be a need to either move up or down the levels, as in a normal binary search. The binary search may be expected to quickly adjust to find the level of generalization. Pseudocode to implement the functions initialLevel (•) and getNextLevel(•) in this case would be as follow:

```
initialLevel (L)
    low = 0
    high = L − 1
getNextLevel (oldLevel, levelDone)
    if (levelDone) low = oldLevel + 1
    else high = oldLevel − 1
    newLevel = (low + high)/2
    if (newLevel = oldLevel) return allDone
    else return newLevel.
```

Any one of these three choices may be used for determining a level of generalization within a hierarchy of taxonomies for searching for a ranked list of documents when performing a generalization search.

Once the system may decide to enumerate documents at a particular level of generalization, a budget may be provided in an alternate embodiment for enumerating the set of documents. As previously presented, a set of documents in docs(S(b)) may be enumerated by issuing a single query g to the index, where g is the m-dimensional grid point, such that g=lca(S(b)). Alternately, it may be more efficient to issue multiple queries $h_1, \ldots, h_m$ to the index so that there may still remain docs(S(b)) ⊆ $\cup_{i \geq 1}$docs($h_i$) but the cost of executing the queries $h_1, \ldots, \overline{h}_m$ may be less than the cost of executing the query g. This may advantageously be applicable when considering specialization as in the top-down search method.

For example, consider a simple scenario in which taxonomies $T_1$ and $T_2$ are unweighted. In this case, each generalization step may add one to the overall generalization cost. For a given query, consider the two-dimensional grid formed by the paths $Q_1^T$ to root($T_1$) and $Q_2^T$ to root($T_2$). Also consider setting the generalization cost b=1 for accessing the documents in docs(S(1)). Further consider lca(docs(S(1))=g=($g_1, g_2$), child($g_1$) to be defined as the child of $g_1$ in $T_1$ along the path from root($T_1$) to $Q_1^T$, and child($g_2$) to be defined as the child of $g_2$ in $T_2$ along the path from root($T_2$) to $Q_2^T$. There may be two possible evaluation plans to compute docs(S(1)) in this instance: a single query for g=($g_1, g_2$) may be submitted or two distinct queries may be submitted: {($g_1$, child($g_2$)), (child($g_1$), $g_2$)}. Note that this latter plan may be equivalent to querying for "($g_1$ AND child($g_2$)) OR (child($g_1$) AND $g_2$)." The cost of these two plans may be quite different. The first plan may produce unnecessary elements of (docs($g_1$) \ docs (child($g_1$))) \ (docs($g_2$) \ docs(child($g_2$))); these elements may be unnecessary since they may have a generalization cost of 2 whereas the generalization cost was fixed at b=1. The second plan may produce each element of docs(child($g_1$))\docs(child ($g_2$)) twice. Deciding which plan to choose may depend on which type of unnecessary work may be least expensive.

For larger values of b, it may become less obvious what the possible query plans may be. It may be desirable to seek plans that may be minimal in the sense that no query may be specialized without losing potentially valid response documents, and it may be possible to construct situations for which any minimal plan may be fine. Thus, in general, there may be a large number of candidate query plans to consider.

More concretely, consider looking for documents in reference to FIG. 5 where the generalization cost may be set to b=4. There may be several query plans for finding documents in docs(S(4)). For the query plan (Palo Alto, Restaurants), the documents in (Palo Alto, Restaurants) \ (Palo Alto, Italian) may have cost more than 4 and hence may be unnecessary. A possible second query plan may be (Univ. Ave, Restaurant) OR (Palo Alto, Italian), where the documents corresponding to (Univ. Ave, Italian) may be repeated twice. Suppose that there may be no Italian restaurants in Palo Alto, which may be indicated in FIG. 5 by the fact the corresponding grid point may have zero documents. In this case, a valid third query plan may be (Univ. Ave, Restaurant) OR (South Bay, Pizza).

Figure 7:
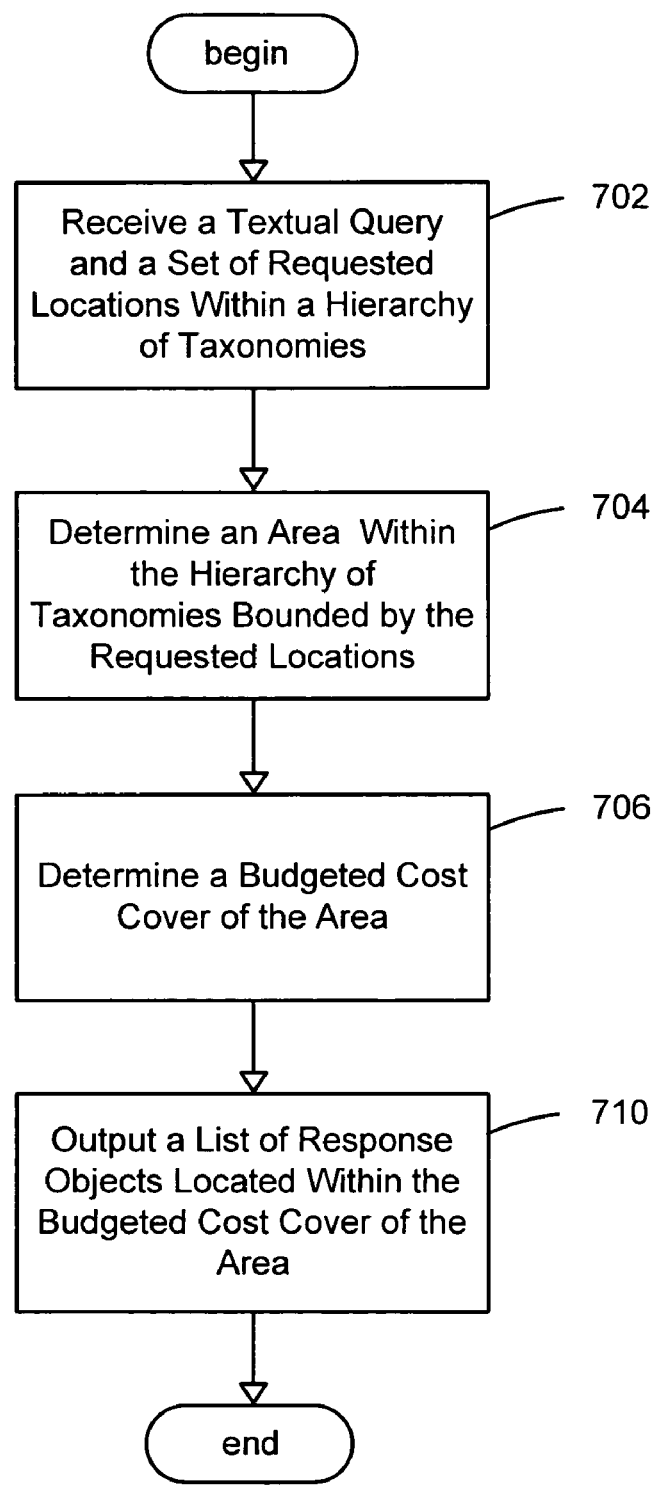
FIG. 7 is a flowchart generally representing the steps undertaken in one embodiment for enumerating a ranked list of documents at a level of generalization using a budgeted generalization search, in accordance with an aspect of the present invention.
Figure 8:
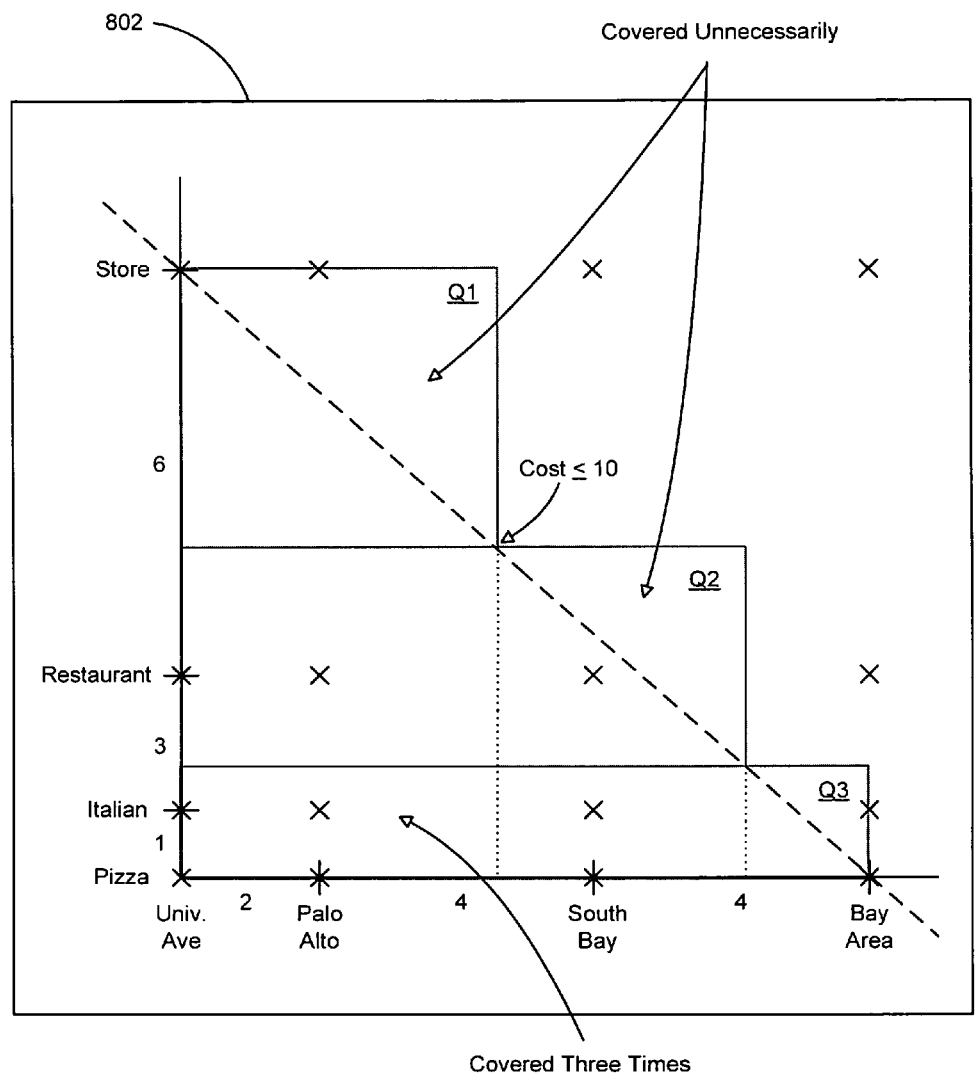
FIG. 8 is an illustration depicting in an embodiment a set of rectangles that may cover an area within a hierarchy of taxonomies bounded by the locations specified for a query, in accordance with an aspect of the present invention.

FIG. 7 presents a flowchart generally representing the steps undertaken in one embodiment for enumerating a ranked list of documents at a level of generalization using a budgeted generalization search. At step 702, a textual query and a set of requested locations within a hierarchy of taxonomies may be received. In response to receiving a textual query and a set of requested locations within a hierarchy of taxonomies, sets of points covering an area within the hierarchy of the taxonomies bounded by the set of requested locations may be determined at step 704. For example, a query (x,y) may represent the textual query that may return the set of documents docs (x,y). If x'≦x and y'≦y, then docs(x',y') ⊂ docs (x,y). A rectangle whose corners may be {(x,y), (x, $\overline{0}$), (0, y), (0, 0)} may be determined to indicate the set of queries that are subsumed by the query (x,y). To generate possible objects within a particular budget, a set of rectangles which cover the simplex may be selected. FIG. 8 may provide an illustration in an embodiment depicting a set of rectangles that may cover an area within a hierarchy of taxonomies bounded by the locations specified for a query. In particular, FIG. 8 presents an illustration depicting in an embodiment a set of rectangles, {Q1,Q2,Q3}, covering a space of possible multi-dimensional generalizations represented in a Cartesian plane 802 for the generalization paths presented in FIG. 3.

In another embodiment where there may be more than two taxonomies, it may be possible to obtain a simple approximation algorithm by treating the budgeted multi-taxonomy search as an instance of finding a weighted set cover for an m-dimensional grid of points. In general, each point in the grid may be considered to "cover" all the points "below" it. More precisely, the point $g=(g_1,\ldots,g_m)$ whose weight may be $C(g)$ may be defined to cover all the points $g'=(g_1',\ldots,g_m')$ where each $g_i'\leq g_i$.

A budgeted cost cover of the area may be determined at step 706. Assume the cost may be known for each possible query, each query may be annotated with the cost $C(x,y)$ of performing the query $(x,y)$. In an embodiment where there may be two taxonomies, a minimal-cost cover may be determined using a simple dynamic program. For a fixed simplex $S(b)$, consider $(x, S(b,x))$ to denote at point at which x may intersect a diagonal face of the simplex, and consider $B(x_0)$ to denote the cost of the minimal-cost cover of those points of the simplex with $x \geq x_0$. Then the cost of the minimal-cost cover may be define as $$B(x_0) = \min_{x \geq x_o} C(x, S(b, x)) + B(\text{next}(x))$$

where next(x) may denote the first x-axis tick mark strictly greater than x. This dynamic program may be iteratively solved until reaching a final solution of B(0) and may require time proportional to the number of points in the simplex to iteratively solve this dynamic program.

In another embodiment where there may be more than two taxonomies, the solution for finding a minimal weight set cover to cover all the points in S(b) may be approximated using standard greedy algorithm to within factor $O(\log|S(b)|)$. Since the problem may have a geometric structure, it may be possible to apply other approximation algorithms known to those skilled in the art.

After determining a budgeted cost cover, a list of response objects located within the budgeted cost cover may be output at step 710. In an embodiment, the list of response objects output may be ranked by scoring each response object as described in reference to step 408 of FIG. 4 above and may be sent to a web browser for display to a user. After outputting the list of response objects, processing may be finished for performing a budgeted generalization search in hierarchies.

Thus the present invention may efficiently enumerate a ranked list of documents at a level of generalization using a budgeted generalization search The system and method may apply broadly to any domains which are amenable to multi-faceted search and navigation, including product and local search. Moreover, the system and method may be applied to online advertising for matching users' queries in a particular context to potential advertisements. Users, queries, and advertisements may each be viewed as sitting within a number of taxonomies. Users for example may be characterized based on locations and interests; queries may be classified into topical taxonomies; and advertisements may be assigned market segments, and potentially placed into other taxonomies either automatically or by the advertiser. Those skilled in the art will appreciate that any domains including objects having textual content may be queried for response objects using the framework described.

As can be seen from the foregoing detailed description, the present invention provides an improved system and method for searching a collection of objects having textual content and being furthermore located in hierarchies of auxiliary information for retrieval of response objects. The system and method may guide a search for an appropriate level of generalization within a hierarchy of taxonomies using the various techniques described. Advantageously, these techniques may adjust the degree of generalization dynamically based upon the response objects seen during the search. Upon deciding to enumerate response objects at a particular level of generalization, a budgeted generalization search may be used in an embodiment for enumerating the set of response objects within a budgeted cost. Such a framework for query processing may flexibly provide sufficiently relevant response objects. As a result, the system and method provide significant advantages and benefits needed in contemporary computing and in online applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
    receiving a query identifying auxiliary information comprising independent taxonomies arranged as trees;
    generating a plurality of queries from the received query;
    retrieving a plurality of documents having both textual content and located within hierarchies of the auxiliary information to retrieve response objects matching at least one keyword of the query and matching at least one location in first and second trees, wherein the at least one location is associated with at least one response object;
    annotating each of the plurality of the documents with a generalization cost of performing the query; and
    performing a budgeted generalization search by:
        executing the plurality of queries on the plurality of documents to locate response objects by directing a search through levels of hierarchies of the taxonomies to find the response objects matching keywords of the query and also matching the taxonomies of the first and the second trees;
        listing the response objects having the generalization cost falling within a budgeted cost; and
        ranking the response objects by the generalization cost;
    wherein the method is performed by one or more processors.

2. The method of claim 1, wherein the generalization cost is based on a first metric and a second metric, the first metric describing a distance between two nodes in the first tree, the second metric describing a distance between two nodes in the second tree.

3. The method of claim 2, wherein the two nodes of the first tree have a parent child relationship.

4. The method of claim 2, wherein the plurality of queries include a first query and a second query, the first query identifying the two nodes of the first tree, the second query identifying the two nodes of the second tree.

5. The method of claim 1, wherein generating the plurality of queries comprises:
    identifying a plurality of nodes along a path between the two nodes of the first tree, the plurality of nodes including the two nodes;
    for each of the plurality of nodes, identifying a corresponding node in the second tree that, when combined in a query with one of the two nodes from the first tree, produces a query with the generalization cost equal to the budgeted cost.

6. The method of claim 2, wherein the first metric is a weighted metric.

7. The method of claim 1, wherein generating the plurality of queries comprises performing a standard greedy algorithm.

8. The method of claim 1, wherein ranking the response objects further comprises ranking each of the documents based on a static score, a text score and the generalization cost.

9. The method of claim 1, wherein the generalization cost corresponding to a particular document in the plurality of documents corresponds to the generalization cost of a particular node containing the particular document.

10. The method of claim 1, wherein the plurality of documents includes documents corresponding to nodes in both the first and second trees.

11. The method of claim 1, wherein the retrieving step further comprises initializing a level in the hierarchies from which to retrieve the plurality of the documents.

12. A non-transitory computer-readable storage medium storing instructions that, when executed by one or more processors, causes the processors to perform:
   receiving a query identifying auxiliary information comprising independent taxonomies arranged as trees;
   generating a plurality of queries from the received query;
   retrieving a plurality of documents having both textual content and located in hierarchies of the auxiliary information to retrieve response objects matching at least one keyword of the query and matching at least one location in first and second trees, wherein the at least one location is associated with at least one response object;
   annotating each of the plurality of the documents with a generalization cost of performing the query;
   performing a budgeted generalization search by:
      executing the plurality of queries on the plurality of documents to locate response objects by directing the budgeted generalization search through levels of hierarchies of the taxonomies to find the response objects matching keywords of the query and also matching the taxonomies of the first and the second trees;
      listing only the response objects having the generalization cost falling within a budgeted cost; and
      ranking the response objects by the generalization cost.

13. The non-transitory computer-readable medium of claim 12 wherein the generalization cost is based on a first metric and a second metric, the first metric describing a distance between two nodes in the first tree, the second metric describing a distance between two nodes in the second tree.

14. The non-transitory computer-readable medium of claim 13, wherein the two nodes of the first tree have a parent child relationship.

15. The non-transitory computer-readable medium of claim 13, wherein the plurality of queries include a first query and a second query, the first query identifying the two nodes of the first tree, the second query identifying the two nodes of the second tree.

16. The non-transitory computer-readable medium of claim 12, wherein generating the plurality of queries comprises:
   identifying a plurality of nodes along a path between the two nodes of the first tree, the plurality of nodes including the two nodes;
   for each of the plurality of nodes, identifying a corresponding node in the second tree that, when combined in a query with one of the two nodes from the first tree, produces a query with a generalization cost equal to the budgeted cost.

17. The non-transitory computer-readable medium of claim 13, wherein the first metric is a weighted metric.

18. The non-transitory computer-readable medium of claim 12, wherein generating the plurality of queries comprises performing a standard greedy algorithm.

19. The non-transitory computer-readable medium of claim 12, wherein ranking the response objects comprises ranking each of the documents in the plurality of documents, wherein a particular document in the plurality of documents is ranked based on a static score for the particular document, a text score for the particular document and the generalization cost for the particular document.

20. The non-transitory computer-readable medium of claim 12, wherein the generalization cost corresponding to a particular document in the plurality of documents corresponds to the generalization cost of a particular node containing the particular document.

21. The non-transitory computer-readable medium of claim 12, wherein the plurality of documents includes documents corresponding to nodes in both the first and second trees.

22. The non-transitory computer-readable medium of claim 12, wherein the retrieving step further comprises initializing a level in the hierarchies from which to retrieve the plurality of the documents.

* * * * *